United States Patent [19]

Celestino et al.

[11] Patent Number: 5,445,200
[45] Date of Patent: Aug. 29, 1995

[54] BICYCLE ENCLOSING PROTECTIVE COVER

[76] Inventors: Mario Celestino, 9608 Oakdale Ave., Chatsworth, Calif. 91311; Barbara C. Inglehart, 2141 Benecia Ave., Los Angeles, Calif. 90025

[21] Appl. No.: 76,736

[22] Filed: Jun. 14, 1993

[51] Int. Cl.$^6$ ................................................ B60R 9/10
[52] U.S. Cl. .................................. 150/167; 206/335; 296/78.1; 296/136
[58] Field of Search .............. 296/136, 78.1; 206/335; 150/166–168; 224/328

[56] References Cited

U.S. PATENT DOCUMENTS

| | | | |
|---|---|---|---|
| 3,042,111 | 7/1962 | Wytovich | 150/168 |
| 3,820,651 | 6/1974 | Levy | 150/167 X |
| 3,884,523 | 5/1975 | Allen | 150/167 X |
| 3,968,913 | 7/1976 | Weed et al. | 150/167 X |
| 4,009,744 | 3/1977 | Joslyn | 150/167 |
| 4,356,831 | 11/1982 | Adams | 150/167 |
| 4,715,646 | 12/1987 | Goffi et al. | 150/167 X |
| 4,944,340 | 7/1990 | Tortorich | 150/167 |
| 4,976,389 | 12/1990 | McLellan et al. | 150/167 X |
| 4,997,229 | 3/1991 | Swanson | 150/166 X |
| 5,193,724 | 3/1993 | Robbins | 150/167 X |
| 5,282,502 | 2/1994 | Ballard | 150/167 |

FOREIGN PATENT DOCUMENTS

| | | | |
|---|---|---|---|
| 439155 | 7/1991 | European Pat. Off. | 224/328 |
| 1042510 | 11/1953 | France | 150/166 |
| 2434076 | 4/1980 | France | 296/136 |
| 5526208 | 1/1987 | Germany | 150/167 |
| 558022 | 2/1957 | Italy | 296/78.1 |

Primary Examiner—Sue A. Weaver
Attorney, Agent, or Firm—David O'Reilly

[57] ABSTRACT

A bicycle protective cover comprised of a fabric or plastic flexible material that conveniently and easily wraps around and completely encloses a bicycle. The cover is provided in a single piece having pockets contoured to comfortably fit the bicycle seat and the handlebars. Each of these pockets is closed by a hook and loop fastener. Circular portions at each end of the cover are provided with flexible elastic borders allowing them to be stretched around and retained on the front and rear wheels. The remaining panel of the cover then folds over the bicycle to completely seal and enclose the bicycle. The closing panel is provided with an elastic cord around the periphery of its border to draw the cover tight once it is completely wrapped around the bicycle. The cover includes webbing appropriately placed to aid in conveniently aligning the cover with the wheels, the seat, or the handlebars. The wheel covers are drawn around each side of the wheel and the closing panel installed by first installing the fitted pockets over the seat and the handlebars. The closing panel is then drawn tightly around the opposite side of the bicycle.

10 Claims, 6 Drawing Sheets

BICYCLE ENCLOSING PROTECTIVE COVER

FIELD OF THE INVENTION

This invention relates to protective covers for bicycles and more particularly relates to a protective cover that wraps around and completely encloses a bicycle.

BACKGROUND OF THE INVENTION

Bicycles have become an increasingly popular mode of transportation because of the increasing cost of other modes due to fuel prices and other factors. They are economical to operate and maintain and provide healthful exercise to an ever health conscious public. With this increase in popularity have come more and better bicycles and of course more expensive models. The increase in quality and cost means there is now greater interest in taking care to protect the bicycle against corrosion from the elements.

Many bicycles now have complex precision speed and brake controls. Dust and moisture can be damaging to these precision components as well as to the frame itself. For that reason, protective covers are needed to prevent the corrosion effects of environmental elements.

Many different types of protective covers have been designed for bicycles and other two wheel vehicles such as motorcycles. Some are in the form of nothing more than just a plastic bag with a drawstring, while others employ more elaborate designs that fold, wrap or otherwise fit around the bicycle. While some of these devices are effective, they are not necessarily efficient and easy to use. They often are difficult for one person to install.

One such device for shipping bicycles is shown and described in Levy, U.S. Pat. No. 3,820,651 issued Jun. 28, 1974. This protective cover is nothing more than a large plastic bag with a tie string. These are bags put up on a roll joined end to end, much like a roll of trash bags. A bag is pulled from the roll over the bicycle and drawn tight by a drawstring. The task is not one easily handled by one person without some aid. One would have to hold the bicycle up with one hand and pull the bag over it with the other.

Another device is disclosed and described in Allen, U.S. Pat. No. 3,884,523 issued May 20, 1975. This patent discloses a flexible material cover stored in a compartment fastened to the seat of the vehicle. It is simply pulled out of the storage compartment and draped over the vehicle. It is convenient and easy to use but doesn't provide a great deal of protection. It is not fastened completely around and does not enclose the vehicle.

Other bicycle covers are shown in U.S. Pat. Nos. 3,968,913 of Weed, U.S. Pat. No. 4,009,774 of Joslyn and U.S. Pat. No. 4,356,831 of Adams. Each shows a cover that folds over or is wrapped around a bicycle. They employ snaps or drawstrings to close the cover. Weed and Joslyn are designed to cover a bicycle on a vehicle carrying rack, while a third patent of Adams provides reinforced holes in the cover to allow a conventional bike rack to be used. None appear easy to install by one person.

It is therefore one object of the present invention to provide a bicycle protective cover that can be easily and quickly installed by one person.

Yet another object of the present invention is to provide a bicycle protective cover that completely wraps around the bicycle and is sealed against the elements.

Yet another object of the present invention is to provide a bicycle protective cover that incorporates alignment guides into the cover.

Still another object of the present invention is to provide a protective bicycle cover that can be used alone or with a vehicle carrying rack.

Another object of the present invention is to provide a protective cover for bicycles that includes alignment devices to make the cover easy to install.

BRIEF DESCRIPTION OF THE INVENTION

The purpose of the present invention is to provide a sturdy, durable protective cover of flexible material that is easy to install and completely wraps around the bicycle.

The cover is preferably made of a durable waterproof, fabric, cloth or plastic material that can be easily folded over the top of the bicycle and sealed around the wheels, the seat, and the handlebars. In a first embodiment of the invention, the cover is comprised of a large sheet of fabric having sections forming fitted pockets for enclosing the handlebars and the seat. The fabric cover is installed by first wrapping the seat and the handlebars with the pockets formed by separate sections on the large fabric cover. The seat and handlebars are then closed by hook and loop closures mounting on alignment aiding webbing to guide the user in the installation. The webbing is constructed to follow the contours of the seat and the handlebars to indicate to the user how the installation is to be completed.

When the seat and handlebar pocket portions are wrapped around the seat and handlebars the folded cover will drape down one side of the bicycle. Half of the cover then can be folded over the crossbar extending between the seat post and the yoke, allowing the cover to hang down both sides of the bicycle.

Fitted cover sections specifically formed to cover the wheels are extended and pulled around the front and back wheels. Each of the wheel covers is provided with webbing to indicate the alignment of the cover with the plane of the wheel. The periphery of the wheel covers is provided with an elastic material to retain it on the wheel. Thus each wheel cover is first pulled around the back or front wheel respectively and drawn tight. The fitted sections the bottom, top and along one side of the cover wheel which can be put on by one person by simply lifting first the back end and then the front end of the bicycle.

After completing coverage of the wheels, the user moves to the other side of the bike and completes the installation by pulling the remaining loose portion or panel of the cover around the back and the front wheels to completely cover the other side. Upper end corners of the cover are provided with cords which are preferably elastic and extend from one upper corner, along the peripheral edge of the cover to the other upper corner. Thus when the cover is pulled tightly around the wheels it provides a complete enclosure. The drawstrings at each upper corner can be pulled diagonally toward the front and rear and fastened in loops or rings provided at the lower edge of the bicycle cover. Each fastening section of the cover is provided with a hook that attaches to a D-ring or loop secured to the lower section of the cover.

The fastening cords, which are preferably flexible elastic cords such as bungee cords, are then pulled tightly to draw the cover securely around the wheels toward each other to completely enclose the bicycle. Thus the bicycle is completely and securely enclosed in a protective cover including the seat, handlebars and wheels.

Triangular portions of the cover that fit below the seat post and just behind the yoke of the bicycle are provided with openings for mounting the bicycle on a car rack after the cover is installed. These triangular sections are closed by three flap sections that overlap each other and are secured by hook and loop or Velcro fasteners.

In an optional embodiment of the invention, the cover is first laid out on the ground and instead of wrapping from the top down it is wrapped from the bottom up. As before, sections forming pockets for the handlebars and the seat are provided. The cover is provided with a section to indicate alignment of the bicycle on the cover when it is laid out on the ground. The wheel cover panel having the ends including an elastic cord are first wrapped around the back and front wheels. The remaining portion of the cover is then lifted over the bicycle with the two sections forming fitted pockets for the seat and the handlebar installed. These are then sealed along their selected edges with hook and loop fasteners known by the trademark "VELCRO." The remaining portion of the cover is then draped over the opposite side of the bicycle and fastened with two or three drawstrings. Preferably the drawstrings are elastic fasteners that are sewn into peripheral borders of the cover so that as they are pulled toward each other they draw the cover tightly around the bicycle. An additional flexible elastic drawstring may be provided in the center of the cover to draw it tightly downward.

As before, the portions covering the wheels are provided with alignment webbing so that they can be properly aligned with the plane of each wheel.

This cover may also include the openings for mounting the bicycle on a car rack after the protective cover is installed.

The above and other features of this invention will be fully understood from the following detailed description and the accompanying drawings, in which:

DETAILED DESCRIPTION OF THE INVENTION

Figure 1:
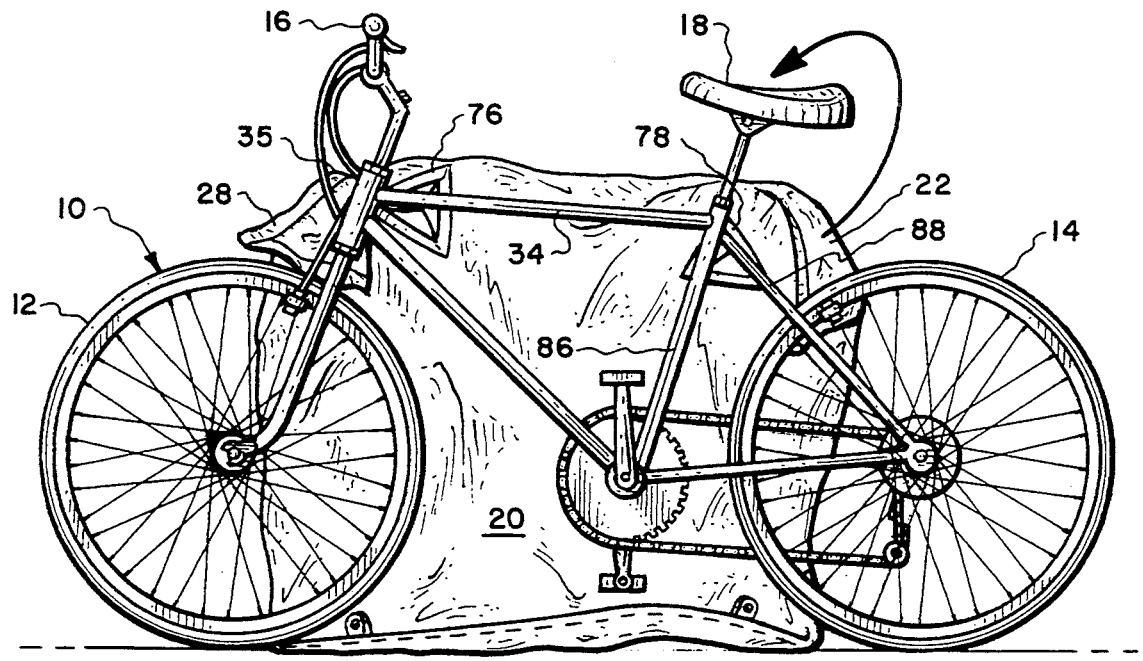
FIG. 1 is a side elevation of a typical bicycle illustrating the installation of a first embodiment of the bicycle protective cover according to the invention.

The bicycle cover of the present invention is constructed of a fabric or plastic material that will allow it to be folded into a compact package for easy carrying and storage. The protective cover is constructed in a size that will fit most standard two-wheel bicycles. The construction and installation of the bicycle protective cover of the first embodiment is illustrated in FIGS. 1-8. A standard two-wheel bicycle 10 is illustrated in FIG. 1 having a front wheel 12, rear wheel 14, handlebars 16 and conventional seat 18. Protective cover 20 may be first draped along one side of the bicycle 10.

Figure 2:
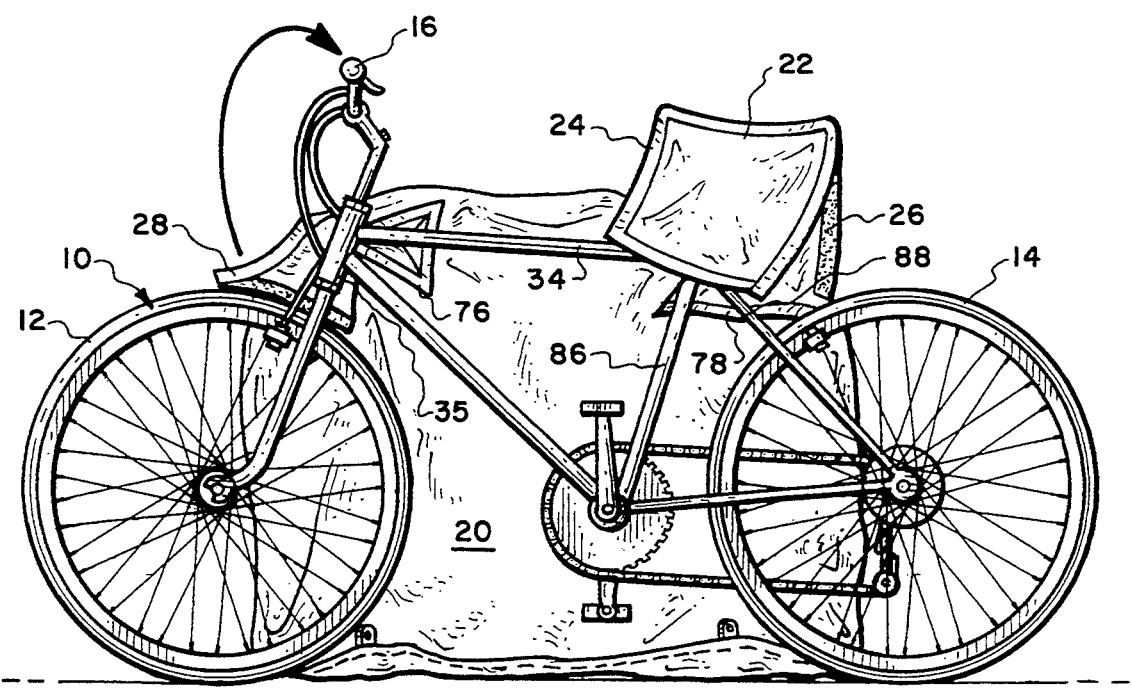
FIG. 2 is a side elevation of a bicycle illustrating additional steps of installing the embodiment of FIG. 1.

The first step illustrated in FIG. 2 is to drape a fitted pocket 22 formed in the cover, over the seat 18 of the bicycle. Fitted pocket 22 forming the seat cover is provided with webbing 24 around the periphery to substantially outline the shape of the seat. A hook and loop fastener 26 along a rear edge seals pocket 22 around seat 18.

Figure 3:
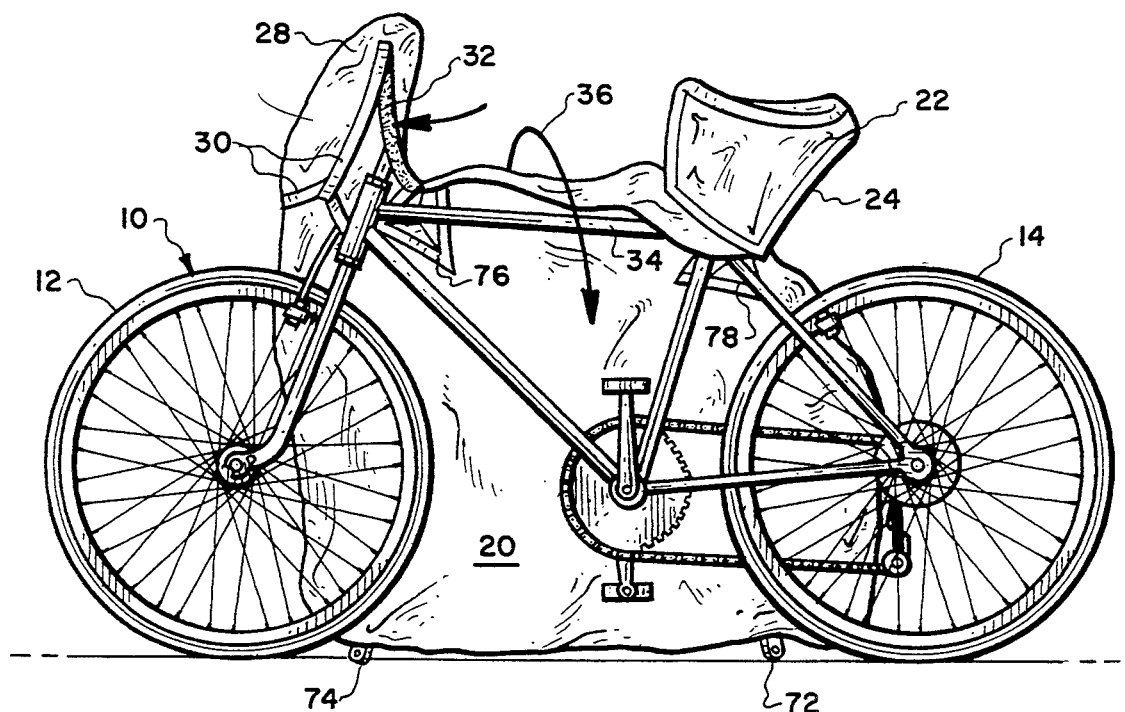
FIG. 3 is a side elevation of a bicycle illustrating additional steps of installing the bicycle protective cover of the first embodiment.

The next step is to lift fitted handlebar pocket 28 formed on cover 20 over handlebars 16 as shown in FIGS. 2 and 3. Fitted handlebar pocket 28 as with seat pocket 22 is constructed to fit the contour of most handlebars. Handlebar cover also includes webbing 30 around the periphery to guide the user in installing the cover. One edge of fitted handlebar pocket 28 is provided with hook and loop fastener 32 to seal pocket 28 over handlebars 16.

Figure 4:
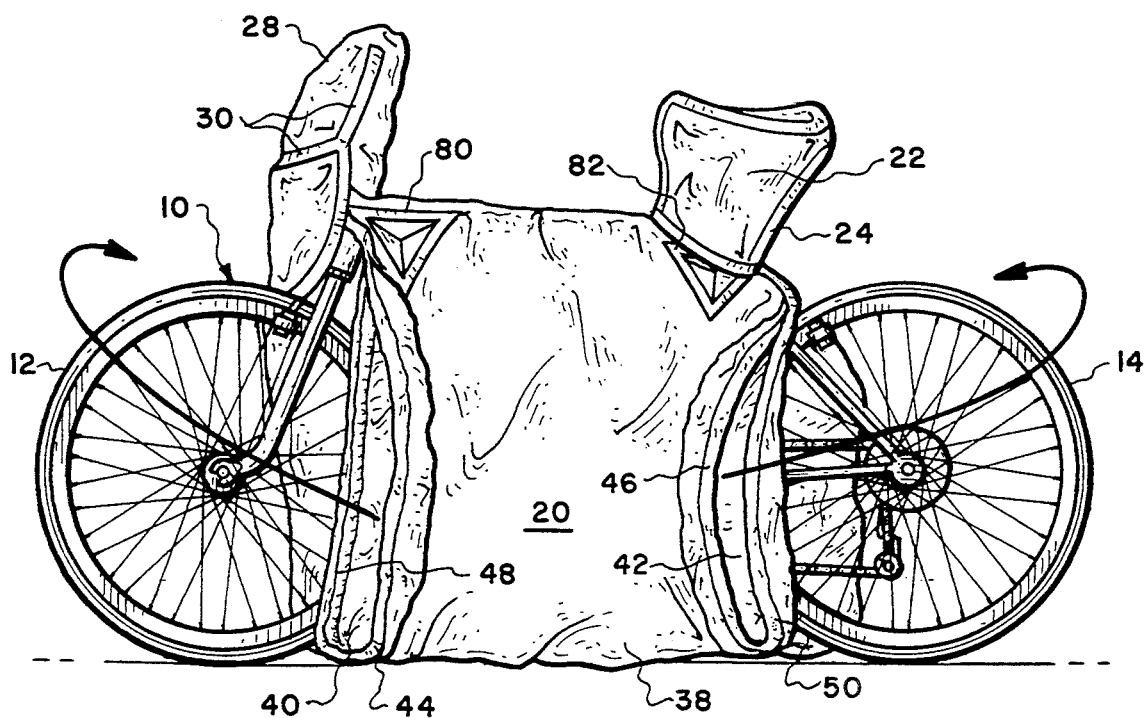
FIG. 4 illustrates the handle bars and seat covered before covering the wheels.

With seat pocket 22 and handlebar pocket 28 thus installed, the bicycle protective cover 20 now drapes conveniently along one side of bicycle 10. Half of protective cover 20 may now be conveniently draped over crossbar 34 as indicated by arrow 36 in FIG. 3. Half of protective cover 20 will now hang down on both sides of bicycle 10 as illustrated in FIG. 4. Each end of protective cover panel 38 now hanging on the nearside of bicycle 10 is provided with a fitted circular portion for fitting front and back wheels 12 and 14 respectively. Each one of these somewhat circular sections 40 and 42 is provide with webbing 44 and 46 for aligning these sections over the wheels 12 and 14 so that they are parallel with the plane of the wheels. An elastic chord is preferably sewn into seam or borders 48 and 50 of each circular section 40 and 42 to retain these sections around front and back wheels 12 and 14 respectively.

Figure 5:
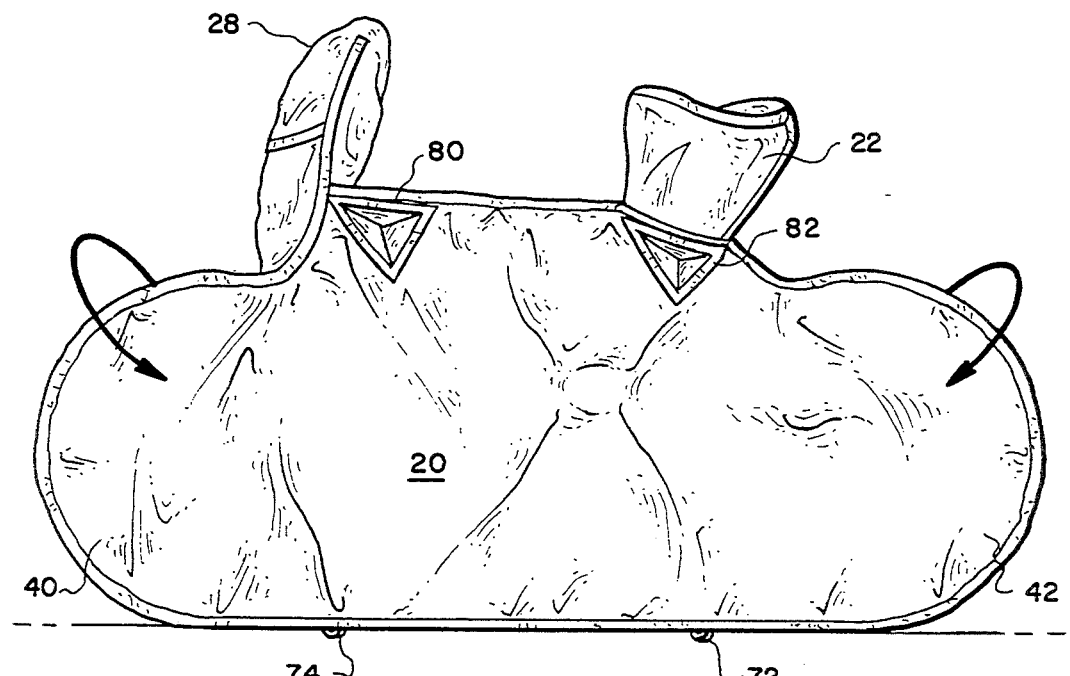
FIG. 5 illustrates the cover wrapped around one side of the wheels.

The next step is to draw wheel cover 40 around wheel 12 with elastic cord in seam border 48 retaining the cover over the wheel. Rear wheel cover 42 is then drawn around rear wheel 14 with webbing 46 aligned With the plane of the wheel. Likewise elastic cord in seam border 50 retains cover 42 around rear wheel 14. Protective cover 20 now has wheel cover 40 and 42 drawn around and underneath wheels 12 and 14 with seat pocket 22 and handlebar pocket 28 fastened around the seat and handlebars respectively. The cover is now installed to cover one side of the bicycle as illustrated in FIG. 5.

Figure 6:
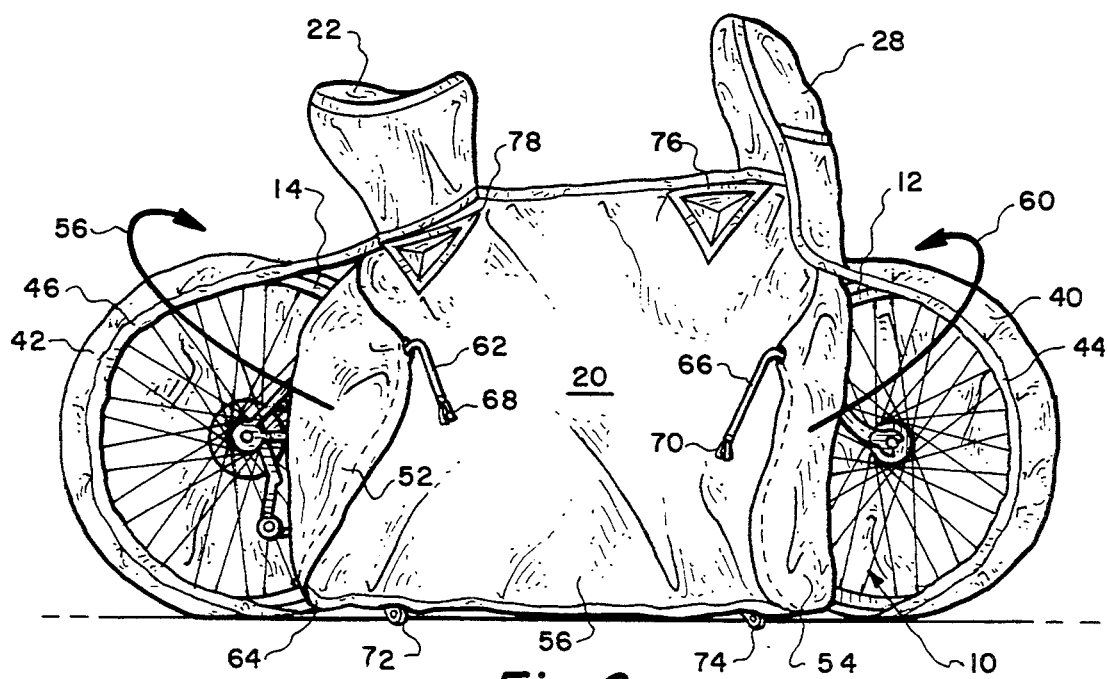
FIG. 6 is a view of the side opposite that shown in FIG. 5 showing the wheels partially covered.
Figure 7:
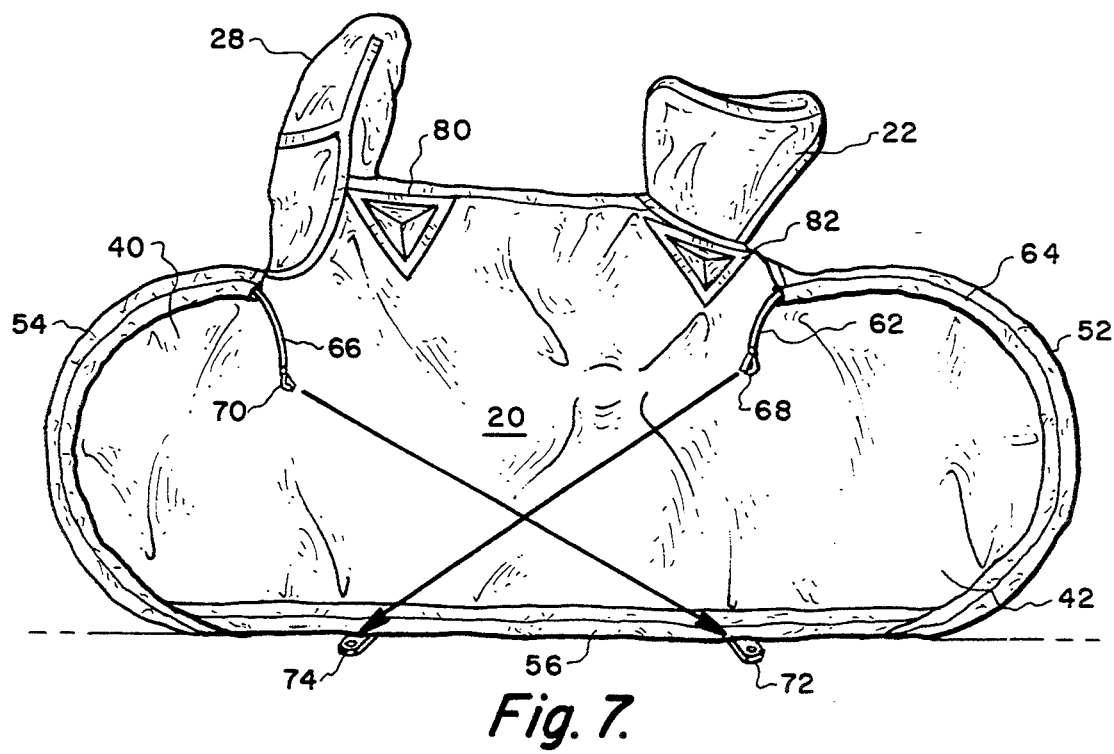
FIG. 7 illustrates the wheels completely covered.
Figure 8:
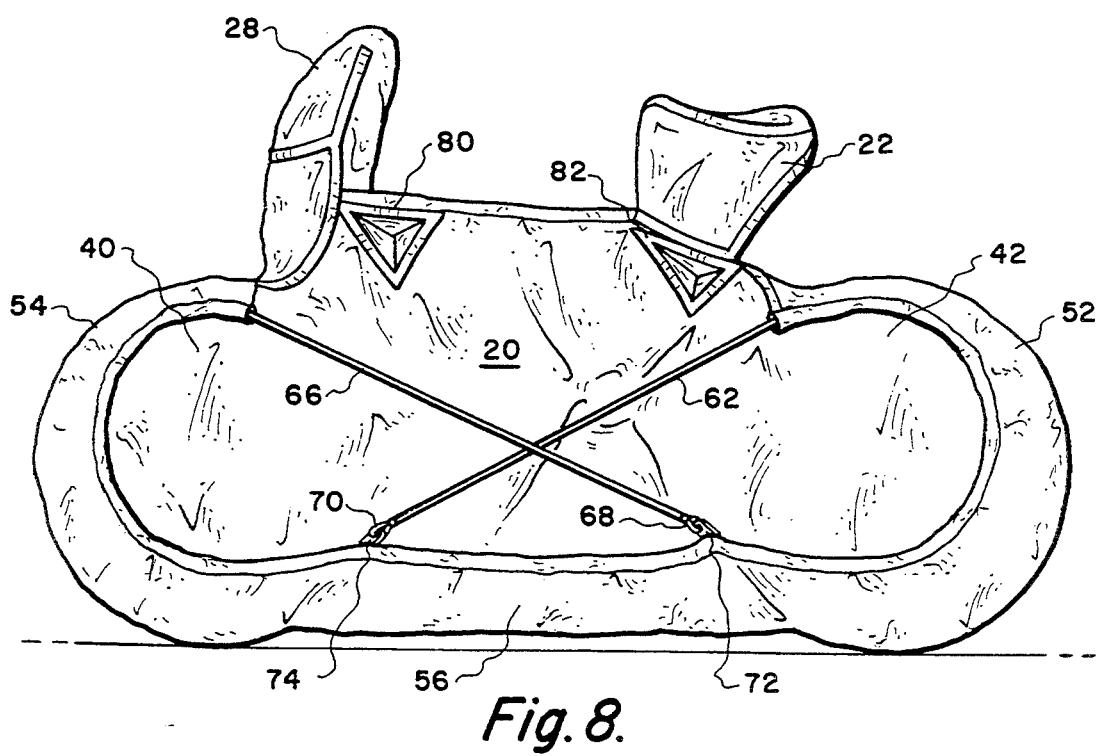
FIG. 8 illustrates attaching the resilient drawstring to tightly draw and secure the covering around the bicycle.

To completely cover bicycle 10 the user moves to the opposite side as shown in FIG. 6, and ends 52 and 54 of remaining panel 56 are pulled around opposite ends of the bicycle as indicated by arrows 58 and 60. Remaining side panel 56 of cover 20 is pulled up over cross bar 34 and around each of the front and rear wheels 12 and 14 respectively into the position to cover the other side for completing the installation as shown in FIGS. 7 and 8. Webbing 35 helps align the cover with cross bar 34.

A drawstring having ends 62 and 66 is built into seam or border 64 around the peripheral edge of panel 56 for drawing the cover tightly around the bicycle to complete the installation. Preferably drawstring 62 extends around the entire border to opposite end 66. Hooks 68 and 70 are provided at each end of drawstring 62 and 66 respectively. Also the lower edge of panel 56 is provide with rings known as D-rings 72 and 74 for receiving hooks 68 and 70.

Hooks 68 and 70 are drawn laterally across each other as illustrated by the arrows and secured in D-rings 72 and 74 as illustrated in FIG. 8. This draws panel 56 tightly up from the bottom and inward from each end as indicated by the arrows to secure the cover around bicycle 10.

Thus bicycle 10 is completely enclosed by cover 20 having fitted seat cover 22 and fitted handlebar cover 28 completely covering the seat and handle respectively wheel covers 40 and 42 aligned with and covering wheels 12 and 14 respectively, and closing panel 56 wrapped around and drawn tight by fastening hook 68 and 70 to D-ring 72 and 74. Bicycle 10 is completely closed and sealed in the cover. Also as can be seen from the steps described above, the cover is easy to install because of the webbing sewn into the cover to provide alignment indications for the seat, handlebars and wheels. The cover can easily be installed by one person guided by the alignment features of the cover. The steps are installing the seat and handlebar covers, drawing the wheel covers around each wheel, then pulling the final panel around and over the wheels tightening and fastening it with the elastic cords. The steps are simple, easy and guided by the construction of the cover.

Figure 9:
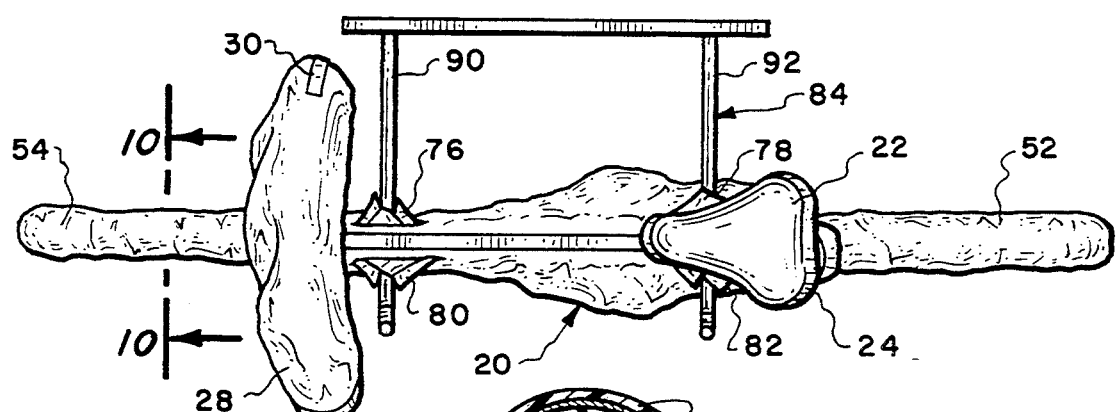
FIG. 9 is a top view illustrating the mounting of a bicycle with the protective cover installed, on a car rack.

The cover will also include identical openings 76 and 78, matching triangular openings 80 and 82 on the opposite sides of cover 20, as shown in FIG. 6, for mounting the bicycle on a bicycle rack 84 as illustrated in FIG. 9. The respective triangular openings are illustrated in FIGS. 6 and 8. Openings 76 and 80 are positioned just behind the junction of yoke 33 and crossbar 34 as illustrated in FIG. 2. Openings 78 and 82 will be positioned behind seat mounting tube 86 and wheel support 88 (FIG. 2) in the triangular area formed by these components. Optionally rear rack mounting opening 78 and 82 could be just in front of seat mounting tube 86 and crossbar 34. These openings are provided to allows support arms 90 and 92 of car mounting rack 84 (FIG. 9) to pass through the openings and support bicycle 10 with cover 20 installed.

Figure 11:
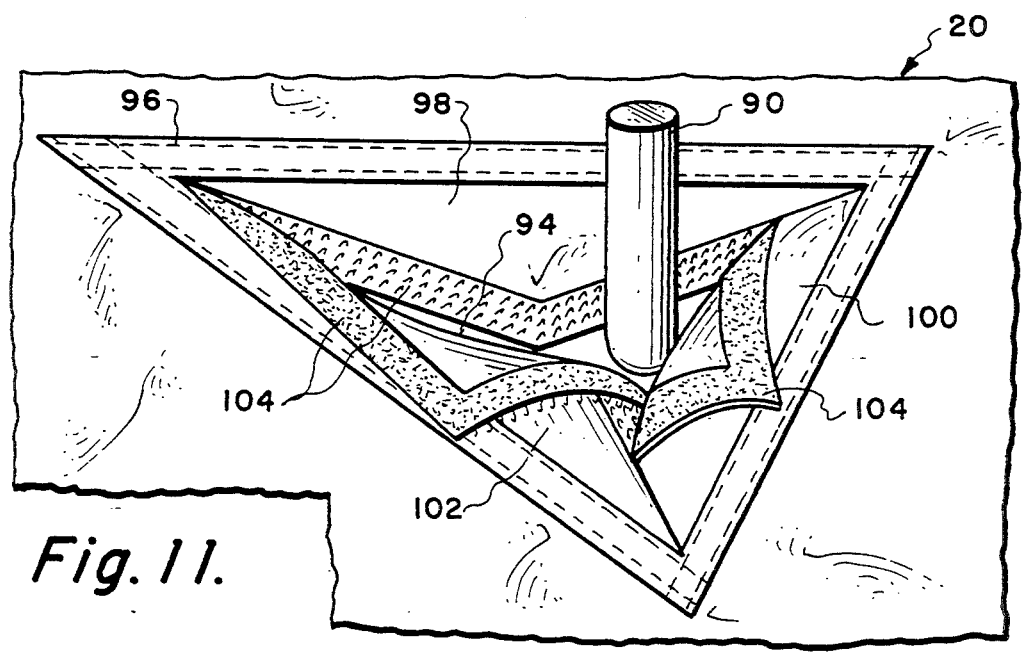
FIG. 11 is a partial view illustrating the formation of openings for mounting the bicycle on a car rack after installation of the protective bicycle cover.

The detail of one of the openings is illustrated in FIG. 11. A triangular shaped opening 94 is provided with reinforcement around the opening of sturdy webbing 96 sewn to the protective cover 20. Triangular opening 94 is sealed by three rectangular panel flaps, 98, 100, and 102 that overlap at their edges. Each edge is covered with a hook and loop mating material 104 to seal opening 94 when it is not mounted on car rack 84. Hook and loop fasteners allow arm 90 of car rack to be easily pushed through the opening when mounted on the car rack without first peeling back the covers.

As was described previously the cover includes a unique construction to aide in aligning the cover when installing on a bicycle. Webbing 24 around fitted seat pocket 22 and similar webbing 30 around fitted handlebar pocket 28 provide alignment for installing these portions of cover 20. Wheel alignment webbing 44 and 46 is sewn on the outside surface of cover 20 to allow wheel cover sections 40 and 42 to be easily aligned when pulled around their respective wheels.

Figure 10:
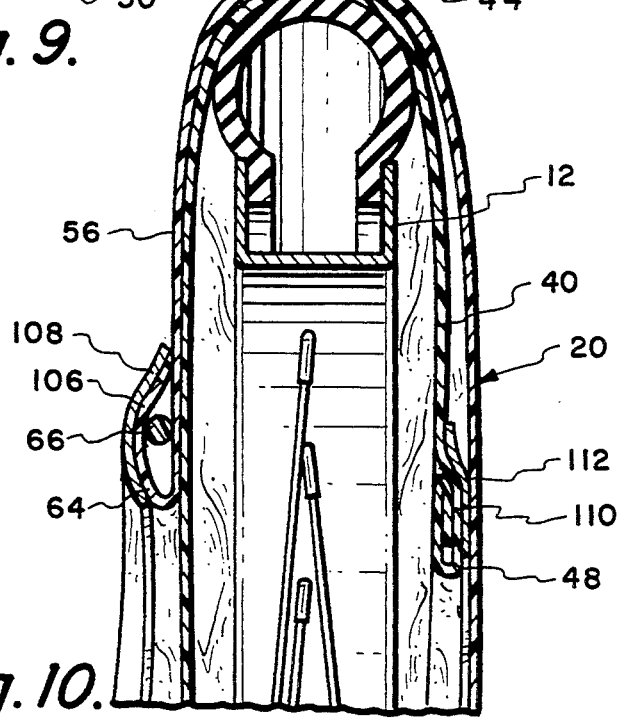
FIG. 10 is a sectional view taken at 10—10 of FIG. 9 illustrating the construction of the bicycle protective cover seams to prevent any loose material.

Wheel alignment webbing 44 is illustrated in sectional view of FIG. 10 which also shows the unique construction of seams to avoid any loose material that might catch when installing the cover. As shown in FIG. 10 borders provided for enclosing drawstrings and elastic restraining cord are sewn to prevent any loose material, particularly on the inside surfaces of the cover, that could catch on any part of the bicycle. For example, elastic drawstring 66 is enclosed in border 106 formed by folding the material outwardly back on itself and the covering it with a webbing 108 to seal the border and eliminate any loose ends. Border 110 on the opposite side forming the circular wheel cover 40 and providing the elastic chord for restraining the wheel cover, is also formed in a similar manner. The material forming the cover 20 is folded back on itself and again webbing 112 is sewn over the border to provide a channel or enclosure for the restraining or elastic chords. This seam structure is followed throughout the construction of the bicycle protecting cover 20 to prevent any loose ends that might catch on parts of the bicycle.

Figure 12:
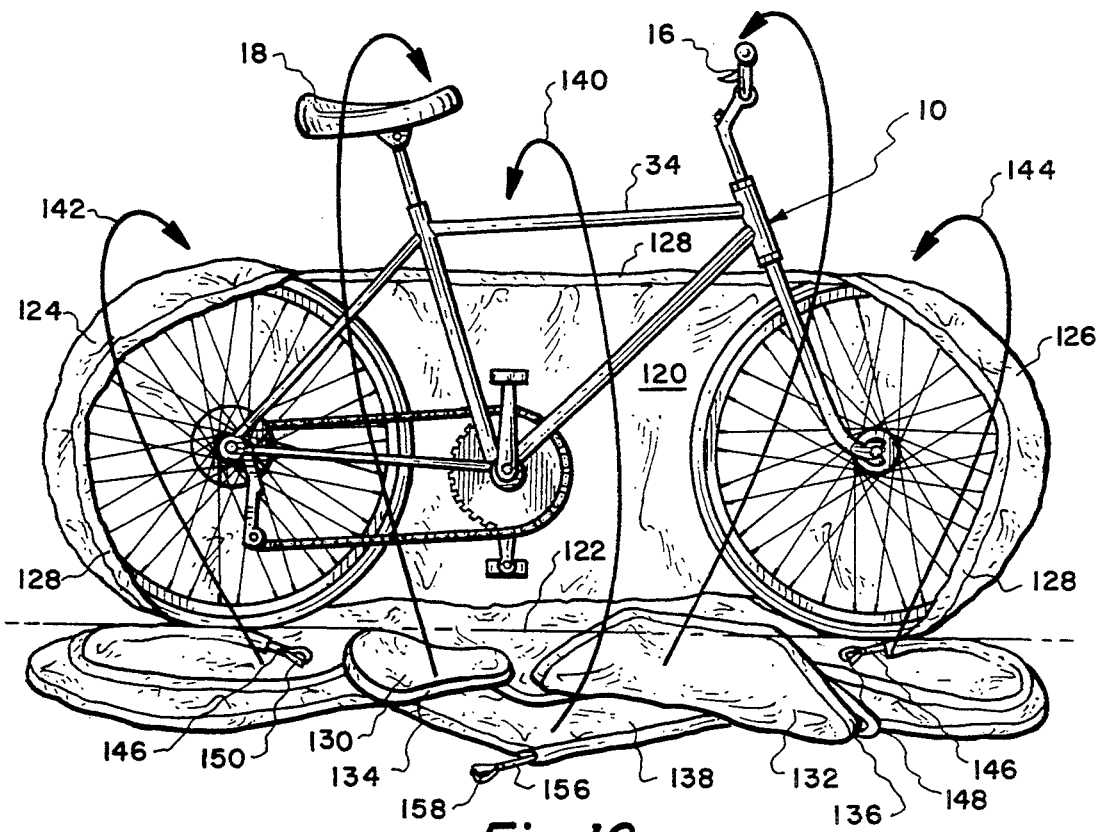
FIG. 12 is a side elevation of a bicycle illustrating the installation of an optional embodiment of the bicycle protective cover.
Figure 13:
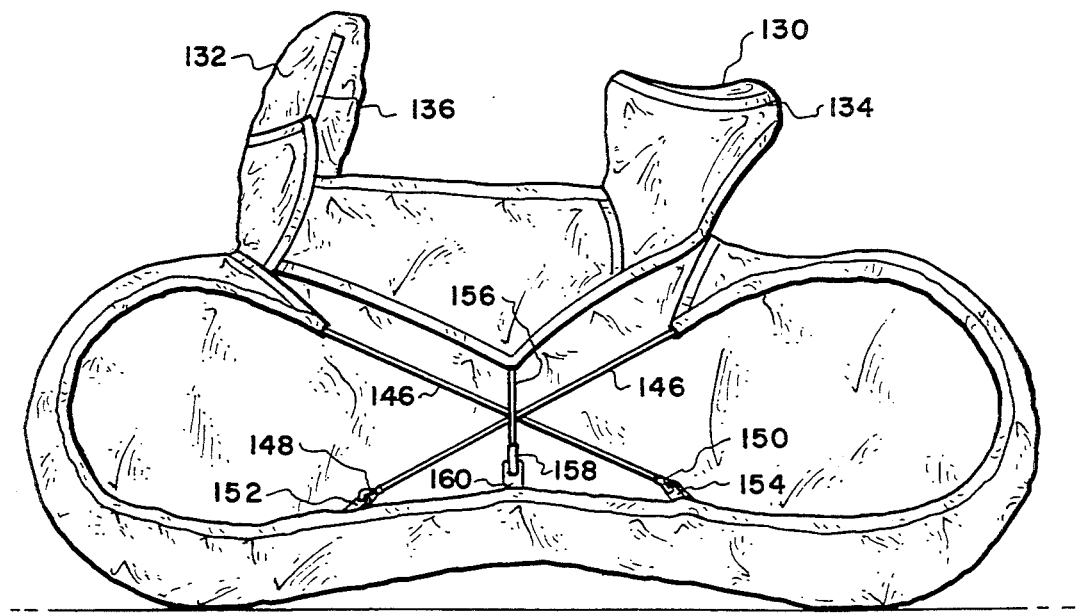
FIG. 13 is an opposite side elevational view illustrating the completion of installation of the optional embodiment of the bicycle protective cover of FIG. 12.

An optional embodiment is illustrated in FIGS. 12 and 13. In this embodiment an advantage is provided in that the bicycle need not be lifted up to place the wheel cover around the wheels. Instead a center seam on cover 120 is provided that fits beneath bicycle 10. This allows protective cover 120 to first be laid out on the ground and the bicycle rolled onto it along center line 122. Wheel cover section 124 and 126 are constructed substantially the same as before except that the wheel passes up over the respective wheels as indicated in FIG. 12 with elastic border 128 passing along the rear side of bicycle 10. However instead of the elastic border being at the bottom, it is now at the top.

The next step is to bring fitted seat pocket 130 and fitted handlebar pocket 132 over seat 18 and handlebar 16 respectively. Fitted seat pocket 130 and fitted handlebar pocket 132 have webbing 134 and 136 providing alignment as before. Likewise seat pocket 130 and handlebar pocket 132 are sealed by hook and loop closure as shown in FIGS. 2 and 3. Installation is completed as shown in opposite side view of FIG. 13 by lifting remaining flexible panel 138 over and aligning webbing 135 with crossbar 34 and pulling it around the wheels as indicated by arrows 140, 142 and 144. The peripheral border of panel 138 includes an elastic drawstring 146 having hooks 148, 150 hooking into D-rings 152 and 154 as before.

Optionally an additional elastic fastening cord 156 having a hook 158 engaging an additional D-ring 160 can be provided. As before the bicycle 10 is completely enclosed in the cover in an efficient and simple manner and sealed against the environmental elements.

After the steps are performed to wrap the cover around the bicycle and engage the hooks with the D- rings, the cover can be tightened by grabbing each elastic chord and pulling on it to tighten the appropriate area of the cover around each wheel. With the cover fully installed as shown in FIGS. 8 and 13 the bicycle is completely enclosed with no part of the bicycle is exposed to the environment.

Thus there has been disclosed a unique and novel bicycle protective cover that is easy to install and use and that completely encloses a bicycle. The cover is constructed of flexible fabric or plastic material for easy alignment with the wheels, seat and handlebars of the bicycle for simple and easy installation by one person.

This invention is not to be limited by the embodiment shown in the drawings and described in the description which is given by way of example and not of limitation, but only in accordance with the scope of the appended claims.

What is claimed is:

1. A protective cover for bicycles and similar two-wheeled vehicles comprising;
    means forming a handle bar enclosure;
    means forming a seat enclosure;
    means for sealing said handle bar enclosure means and seat enclosure means;
    means forming fitted wheel covers, said means forming fitted wheel covers being a protective fabric formed to fit the shape of and wrap around one wheel and extend along the side of said bicycle to wrap around the second wheel;
    alignment means on said means forming said handle bar enclosure, said means forming said seat enclosure and said means for forming said fitted wheel covers for aligning said protective cover with said handle bars, said seat and the plane of said wheels to simplify installation;
    closing panel means folding over and wrapping around a side of said bicycle opposite the side covered by said means forming fitted wheel covers;
    said handle bar enclosure means and seat enclosure means each comprising a pocket, said alignment means comprising webbing trimming said pockets to indicate the outline of said handle bar seat;
    tightening means drawing said closing panel means tight to securely and complete enclose said bicycle;
    whereby said bicycle is completely enclosed and protected from environmental elements.

2. The protective cover according to claim 1 including means for closing said seat enclosure means comprising; webbing along a vertical rear edge of said pocket; and hook and loop fastening means attached to opposite ends of said vertical rear edge.

3. The protective cover according to claim 1 including means for closing said handle bar enclosure means comprising; webbing along one vertical side of said handle bar enclosure means; and hook and loop fastening means attached to opposite edges of said one vertical side.

4. The protective cover according to claim 1 in which said means forming fitted wheel covers comprise circular wheel portions on opposite ends of a protective fabric panel; and elastic cord means secured in a peripheral border of each of said circular portions for retaining said means forming said fitted wheel covers around each wheel.

5. The protective cover according to claim 4 in which said alignment means comprises webbing sewn along an outside peripheral border of said circular wheel portions for alignment with the periphery of said wheels to align said means forming fitted wheel covers with the plane of said wheels.

6. The protective cover according to claim 1 in which said tightening means comprises; an elastic drawstring secured around a peripheral border of said closing panel means; said drawstring extending out opposite ends of said closing panel means; and fastening means for tightening said elastic drawstring to draw said closing panel means tightly around said bicycle.

7. The protective cover according to claim 6 in which said fastening means comprises; a hook in each end of said drawstring; rings on an edge opposite said ends having said hooks; whereby said drawstring can be tightened and hooked into said rings.

8. The protective cover according to claim 7 in which said drawstring is an elastic drawstring.

9. The protective cover according to claim 1 including a concealed seam in said cover between said means forming said seat and handle bar enclosures, along borders of said means forming fitted wheel covers and said closing panel means constructed to prevent any loose material ends.

10. The protective cover according to claim 9 in which said concealed seam comprises; material folded to form seams on an outside surface; and webbing sewed over said seams to conceal all edges.

* * * * *